(12) United States Patent
Feng et al.

(10) Patent No.: US 8,428,392 B1
(45) Date of Patent: Apr. 23, 2013

(54) SYSTEMS AND METHODS FOR MEASURING GEOMETRY PARAMETERS WITH A REFERENCE OBJECT WHOSE THICKNESS CAN NOT BE IGNORED IN IMAGES

(76) Inventors: Xiagen Feng, Wuhan (CN); Jing Han, Wuhan (CN)

( * ) Notice: Subject to any disclaimer, the term of this patent is extended or adjusted under 35 U.S.C. 154(b) by 279 days.

(21) Appl. No.: 12/877,105

(22) Filed: Sep. 8, 2010

(51) Int. Cl.
*G06K 9/36* (2006.01)
(52) U.S. Cl.
USPC .......................................... 382/286; 382/291
(58) Field of Classification Search .................. 382/286, 382/291
See application file for complete search history.

(56) References Cited

U.S. PATENT DOCUMENTS

| | | | | |
|---|---|---|---|---|
| 4,801,207 | A | * | 1/1989 | Williams ....................... 356/606 |
| 5,870,315 | A | * | 2/1999 | January .......................... 700/279 |
| 6,262,818 | B1 | * | 7/2001 | Cuche et al. ...................... 359/9 |
| 6,898,302 | B1 | * | 5/2005 | Brummer ...................... 382/131 |
| 2002/0198447 | A1 | * | 12/2002 | Van Muiswinkel et al. .. 600/410 |

* cited by examiner

*Primary Examiner* — Matthew Bella
*Assistant Examiner* — Patrick Edwards

(57) ABSTRACT

An improvement of measuring geometry parameters of a geometry object from an image with a reference object whose thickness can not be ignored. A hidden point on the plane with which geometry object contacts is computed from visible points. The computed hidden point combined with other points in the same plane is used to compute a homography matrix between a known size shape and its projection in the image. With the computed homography matrix and enough valid points in the image, the geometry parameters of the geometry object are determined. With the geometry parameters of the geometry objects, useful information can be calculated from.

20 Claims, 5 Drawing Sheets image          imaginative reference plane

SYSTEMS AND METHODS FOR MEASURING GEOMETRY PARAMETERS WITH A REFERENCE OBJECT WHOSE THICKNESS CAN NOT BE IGNORED IN IMAGES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application relates to systems and methods for measuring geometry parameters with a single image, specifically with a known size reference object whose thickness can not be ignored in the single image.

2. Prior Art

People suddenly want to measure something in sight, but they haven't a ruler. Even in case a ruler is at hand, the thing to be measured may be in a position where it is difficult to put a ruler near it. In modern world, the number of people who take a camera device (such as mobile phone with digital camera or film camera) is by far larger than the number of people who take a ruler. If it can be seen, an image can be taken with the camera device.

So various measuring methods based on images had been developed. If 4 corresponding point pairs in two projection planes of the same object are known, a homography matrix can be determined. See the famous paper "A computer algorithm for reconstructing a scene from two projections", H. C. Longuet-Higgins, Nature, vol. 293, pp. 133-135, Sept 1981. With this homography matrix and its inverse matrix, any point in the two planes can be calculated from one plane into the other plane and vice versa. The homography matrix is also known as fundamental matrix.

There are various algorithms (e.g., Normalized Direct Linear Transformation, Approximate Calibration and so on) to solve the homography matrix from 4 or more point pairs. For Approximate Calibration algorithm, See the paper "Navigation using affine structure from motion", P. A. Beardsley, A. Zisserman, and D. W. Murray, Computer Vision—ECCV '94, Volume II, LN CS-Series Vol. 801, pp. 85-96, 1994. The Normalized Direct Linear Transformation (normalized DLT) algorithm is based on singular value decomposition (SVD) and the normalization process makes the input point data to be invariant with respect to arbitrary choices of the scale and coordinate changes. See the $4^{th}$ chapter of the book "Multiple View Geometry in Computer Vision, $2^{nd}$ Edition", Richard Hartley and Andrew Zisserman, Cambridge University Press, 2003. A plane measurement device had been described at 1997 by A. Criminisi, I. Reid and A. Zisserman in the webpage of http://www.robots.ox.ac.uk/~vgg/presentations/bmvs97/criminispaper/, in that webpage, a window's width is computed with a reference covering several other windows.

The current plane measuring method consists of 3 steps. First step is to take a image of the whole scenario, second step is to measure some reference object in the scenario with other measuring method (e.g., real ruler or laser scan) to get the metric data of the reference object and identify 4 point pairs in the image, third step is to compute the homography matrix and the length of line in the image.

The dependency of other measuring methods in second step makes it less useful. The current methods and systems also ignore the thickness of the real reference object, so the ignorance causes inaccuracy of the result if thickness can not be ignored actually.

Some mobile application (such as RulerPhone) uses credit/debit card as a reference object, because the credit/debit card's size is known without measuring, the dependency on other measuring methods is removed, but it had not deal with the perspective at the time of this application. See its website at http://benkamens.com/rulerphone.

If a geometry equation in Cartesian coordinates is already known with the unknown geometry parameters, enough independent points can determine the geometry parameters for the geometry equation. In http://mathworld.wolfram.com/Circle.html, if 3 valid points in the circle are provided, the geometry parameters (a.k.a., center and radius) of the circle can be determined. In http://mathforum.org/library/drmath/view/51735.html, if 5 valid points in the ellipse are provided, the center, axes and orientation can be determined.

When the geometry parameters are represented with real world metric values, calculating geometry parameters is considered as measuring geometry parameters because the geometry parameters have practical meanings.

SUMMARY

Systems and methods for measuring geometry parameters with a single image are provided. In particular, systems and methods for measuring geometry parameters of geometry objects in the same plane contacting with a reference object are provided regardless of the thickness of the reference object.

This invention teaches a technique of calculating hidden corner point(s) of real measuring plane if thickness of the reference object can not be ignored in the image before homography matrix is computed which leads to a more precise measurement result.

It also combines methods to measure nonlinear geometry parameters besides the line length. In some embodiments, the point position is measured, in other embodiments, center and radius of a circle is measured with a single image. It can calculate any geometry parameters provided the geometry equation of the geometry object in Cartesian coordinates is already known and enough valid points in the image are identified properly.

Different aspects of the invention describe the way how real measuring plane is calculated and how to calculate nonlinear geometry parameters in imaginative reference plane.

DRAWINGS

Figures

The above and other objects and advantages of this invention will be apparent upon consideration of the following detailed description, taken in conjunction with the following accompanying drawings.

DETAILED DESCRIPTION

The present invention can measure geometry parameters from a single image with a reference object which has a known size shape in one of its surfaces. This invention deals with practical problems when certain kind of real object is used as a reference. The system also extends the measuring of line length to geometry parameters of a geometry object with a known geometry equation in Cartesian coordinates.

The inventor has recognized a number of problems which exist when only homography matrix is used to measure with a real reference object in an image.

When the reference object is looked too small in the image, the error in identifying point position of the reference object leads to significant inaccuracy, especially when the measured target geometry object is much larger (e.g. 10 more times in scale) than the reference object, even only first order model of uncertainty prediction is guaranteed in the prior art.

When the reference is looked too large in the image, the thickness of the reference object can not be ignored. Calculating with the visible surface points leads to inaccuracy. The radial distortion of the camera lens also leads to minor inaccuracy compared with the inaccuracy described above. The restriction of using non-real number instead of real number to represent point position leads to inaccuracy too.

One aspect of the present invention decreases the inaccuracy caused by thickness of the reference object by computing the hidden point(s).

Figure 1:
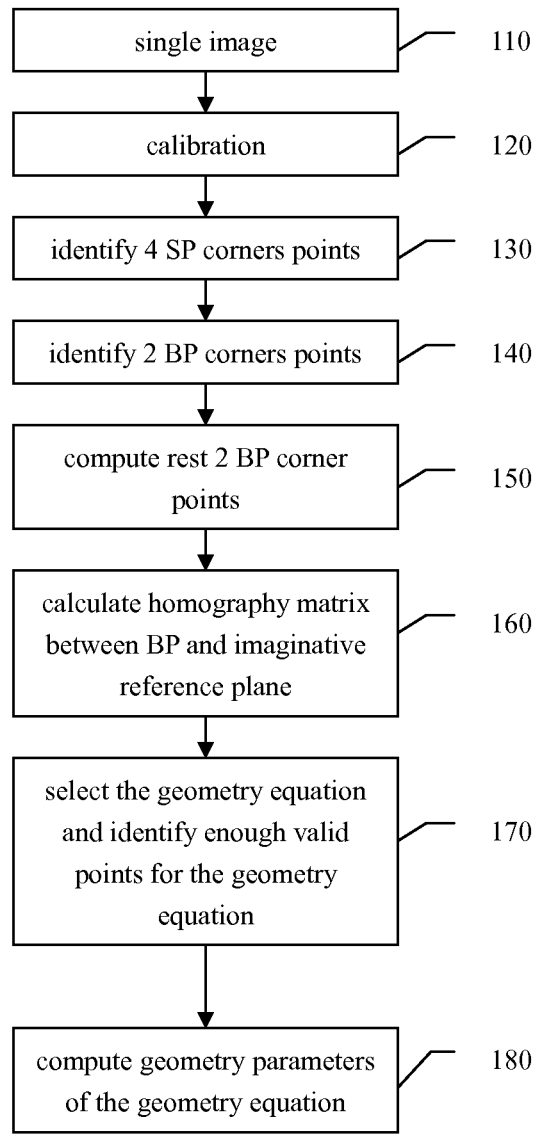
FIG. 1 shows a system flowchart.

The overall process is shown in flowchart of FIG. 1. The FIG. 1 flowchart may be carried out on any machines which are capable of processing information and obtaining vision type information. An exemplary embodiment is the iPhone's application PRuler Lite which is developed and submitted by the inventor.

Furthermore, although PRuler Lite is depicted as an exemplary embodiment which processes the whole flow in an iPhone® device, one skilled in the art could appreciate that the process is not restricted with certain type of devices. It can be carried out in other handheld devices (e.g., Android®, Windows Mobile® or Symbian® devices and so on), a tablet pc (e.g., iPad® and so on), a computer or any other suitable devices.

Alternate embodiments may divide the process into several sub-processes which are carried out on different machines which are capable of processing information and obtaining vision type information separately or manually. For example, an image is taken with a film camera, the point positions on the roll film are identified and recorded manually, then point positions recorded are input into a server through a web-page, the server does the computation and gives out the geometry parameters result. One skilled in the art could appreciate that any of the sub-processes can be merged or divided further. For example you can merge the web-page submission with the server-side computation into a local computer program.

The reference object consists of several outer finite surfaces, the infinite plane on which one of these outer finite surfaces exist on is called imaginative surface plane.

This invention needs the reference object to fulfill all the following criteria:

1. The reference object has 2 parallel imaginative surface planes substantially and is not easy to bend substantially when used as a reference;

2. There are 4 imaginative point pairs in which one point in the pair exists in one imaginative surface plane and the other point in the same pair exists in the other parallel imaginative surface plane. Two points in any single imaginative point pair form a line which is parallel with other lines formed by two points of other single imaginative point pair. The 4 points in the 4 imaginative point pairs on the same imaginative surface plane form a known size shape. The known size shape is called 4 points shape.

3. One of the imaginative surface planes contacts with the plane on which geometry object to be measured exist.

The imaginative surface plane on which geometry object to be measured exist is called the measuring plane, MP for short. The point on MP is called the measuring plane point, $mp_n$ for short where n is a non-positive integer.

The imaginative surface plane of the reference object which contacts with MP is called back plane, BP for short. The points in the 4 imaginative point pairs which are on BP are called back plane corner points, $bp_n$ for short where $n \in \{0, 1, 2, 3\}$.

The imaginative surface plane of the reference object which is parallel with BP and does not contact with MP is called surface plane, SP for short. The points in the 4 imaginative point pairs which are on SP are called surface plane corner points, $sp_n$ for short where $n \in \{0, 1, 2, 3\}$. For convenience, $sp_n$ and $bp_n$ form an imaginative point pair where $n \in \{0, 1, 2, 3\}$, but other point pair pattern is possible and equivalent.

A regular shape credit card or a known size hard cover book in normal condition is a good example of reference object which fulfills above 3 criteria. Because the 4 points shape's size is already known, measuring reference object in step 2 of prior art can be omitted. For example, a regular shape credit card always has a 4 points shape of 85 millimeter in height and 54 millimeter in width substantially. Because the parallelism of two imaginative surface planes and the lines going through two points of the imaginative point pairs, the 4 points shapes in MP and BP are same in shape and size.

Any point in imaginative point pairs may be an actual point in the reference object (such as the real corner point of the unbending hard cover book), but does not have to be. For a round corner credit card, the point in imaginative point pairs is the intersecting point of two outline of the credit card.

The reference object is not limited to credit card, any thing fulfills the criteria will do. One skilled in the art could appreciate that the reference object may have different shapes. For example, if a star-shape card of 5 corner points is used, any 4 out of 5 corner points are enough to calculate the geometry parameters provided the 4 points shape is already known.

The present invention needs the geometry object which is measured to fulfill the following criteria:

1. The geometry equation of the geometry object in Cartesian coordinates is already known. For example, if the geometry object is a circle, the geometry equation in Cartesian coordinates is known as following:

$$(x-x_{center})^2+(y-y_{center})^2=r^2$$

The $x_{center}$, $y_{center}$ and r are the geometry parameters which will be computed out from enough valid points in image.

2. There is one and only one MP for all points of geometry object. Enough valid points of geometry object could be identified in the image.

The present invention needs the reference object in the image to fulfill the following criteria:

1. The reference object needs to show 4 distinct surface plane corner points and 2 back plane corner points in the image.

After single image including the reference object and the geometry object to be measured is taken at 110, calibration (e.g., radial correction specific to the camera lens) is carried out at 120 if ideal error-free real number value of point position can be input at 130, 140 and 170. If only non-real number value of point position can be input at any of 130, 140 and 170 or there is error in identify point position, the accuracy gained with calibration at 120 will be randomly shifted and calibration is not recommended for practical use.

At 130, $sp_0, sp_1, sp_2, sp_3$ are identified in the image thus their positions in Cartesian coordinates of image are known. There is no restriction on the Cartesian coordinates of the image, but the same Cartesian coordinates should be used during 130, 140 and 170. One skilled in the art could appreciate that $sp_0, sp_1, sp_2, sp_3$ may be identified with other methods. For example, the 4 point positions can be calculated by identifying the 4 outlines and calculating as intersecting points of the outlines.

At 140, 2 of 4 BP corner points are identified in the image thus their positions in Cartesian coordinates of image are known.

Figures 2A, 2B:
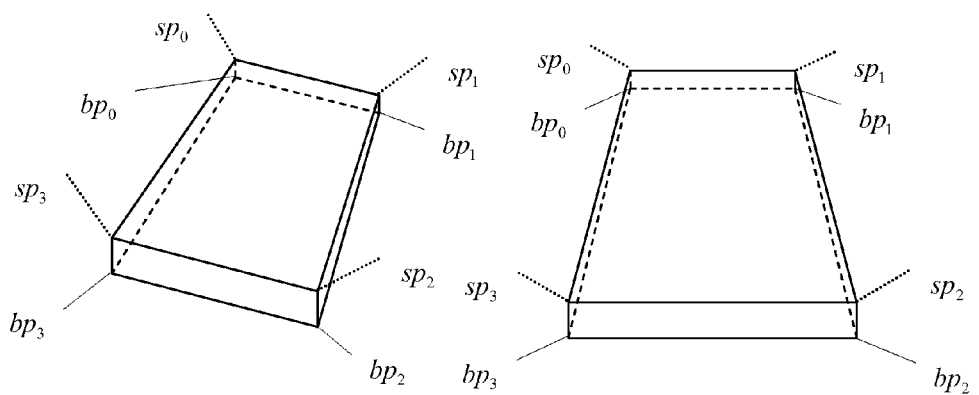
FIG. 2A-2D show illustrations of possible back plane corner point visibility patterns.

Invisible hidden line is drawn with pencil-of-line. FIG. 2A shows an illustration of 3 BP corner points are visible in the image when the reference object is viewed from a higher place.

Figures 2C, 2D:
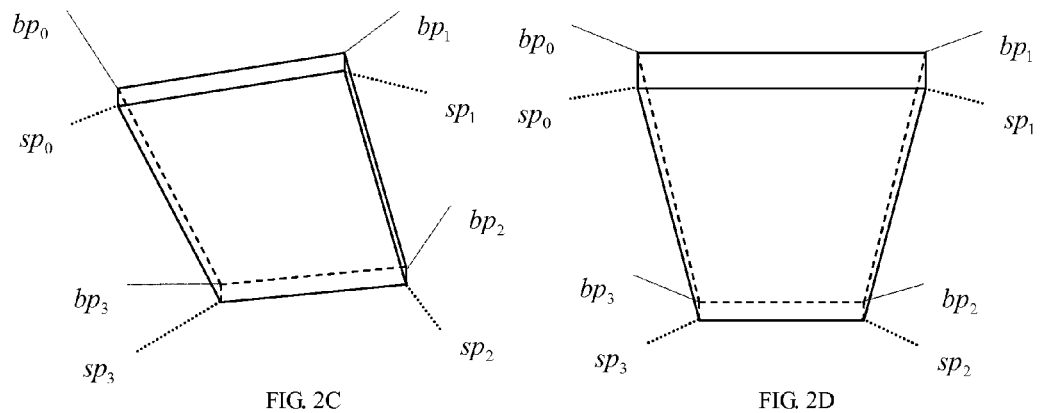

FIG. 2B shows an illustration of 2 BP corner points are visible in the image when the reference object is viewed from a higher place. FIG. 2C shows an illustration of 3 BP corner points are visible in the image when the reference object is viewed from a lower place. FIG. 2D shows an illustration of 2 BP corner points are visible in the image when the reference object is viewed from a lower place. In all cases, there are 2 BP corner points to identify in the image.

There is no restriction on how to index the 4 SP and 4 BP corner points, in FIGS. 2A-2D a clockwise index is used, but any index pattern will do. There is no restriction on how to select 2 BP corner points when there are 3 visible BP corner points, in FIG. 2A and FIG. 2C, any 2 out of 3 visible BP corner points are enough to compute the rest 2 BP corner points.

At 150, the present invention computes the rest 2 BP corner points based on the $sp_0, sp_1, sp_2, sp_3$ input at 130 and 2 BP corner points input at 140.

Figure 3:
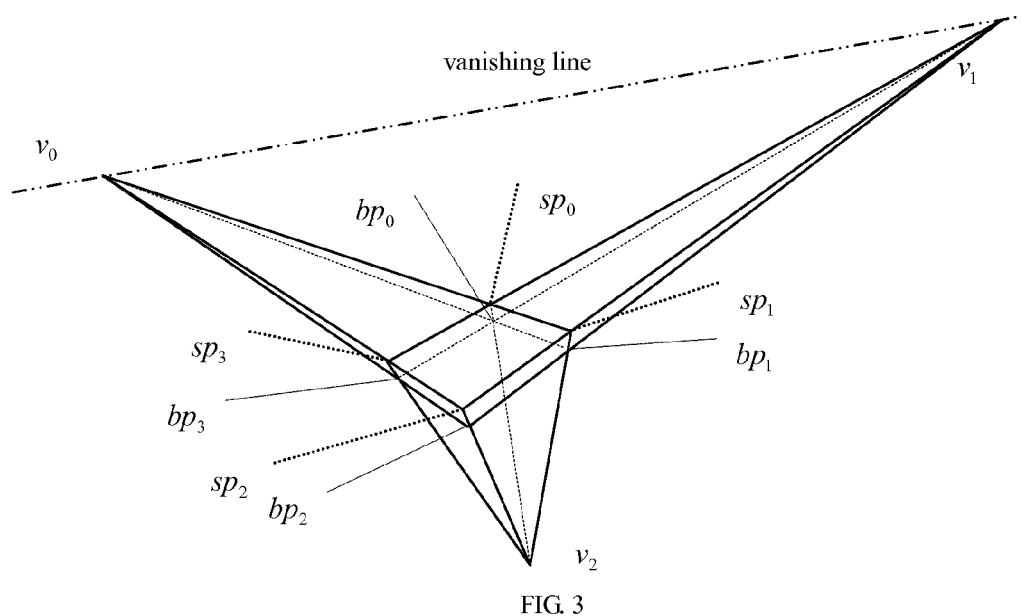
FIG. 3 shows an illustration of a thick reference object with no error in point positions.

If real number value of point position can be input at 130, 140 and 170, and there is no error in identifying point position, the parallel lines should converge into a vanishing point which is depicted in FIG. 3. The valid MP points should not exist in both side of the vanishing line of the image depicted in FIG. 3. The combination number of 2 BP corner points out of 4 is 6. The combinations are listed as $(bp_0,bp_1)$, $(bp_0,bp_2)$, $(bp_0,bp_3)$, $(bp_1,bp_2)$, $(bp_1,bp_3)$, $(bp_2,bp_3)$. In case of $(bp_2,bp_3)$ is input at 140, Exemplary pseudo code for computing rest two BP corner points is given in Table 1.A. In pseudo code of this application, capitalized letter with subscript represents a line; little case word with subscript represents a point.

TABLE 1.A

| Algorithm 1.A of computing $bp_0, bp_1$ with input of $sp_0, sp_1, sp_2, sp_3, bp_2, bp_3$ |
|---|
| $S_1$ = make line from $sp_1, sp_2$ |
| $S_3$ = make line from $sp_0, sp_3$ |

TABLE 1.A-continued

| Algorithm 1.A of computing $bp_0, bp_1$ with input of $sp_0, sp_1, sp_2, sp_3, bp_2, bp_3$ |
|---|
| $v_1$ = get intersect of $S_1, S_3$ |
| $E_2$ = make line from $sp_2, bp_2$ |
| $E_3$ = make line from $sp_3, bp_3$ |
| $v_2$ = get intersect of $E_2, E_3$ |
| $B_0$ = make line from $v_1, bp_3$ |
| $B_1$ = make line from $v_1, bp_2$ |
| $E_0$ = make line from $v_2, sp_0$ |
| $bp_0$ = get intersect of $B_0, E_0$ |
| $E_1$ = make line from $v_2, sp_1$ |
| $bp_1$ = get intersect of $B_1, E_1$ |

Because there is no error in point position, parallel lines should converge into a vanishing point in perspective view, $v_0, v_1, v_2$ should exist.

One skilled in the art could appreciate that one more vanishing point can be used to solve the same problem. Exemplary pseudo code for computing rest two BP corner points which includes calculating one more vanishing point is given in Table 1.B.

TABLE 1.B

| Algorithm 1.B of computing $bp_0, bp_1$ with input of $sp_0, sp_1, sp_2, sp_3, bp_2, bp_3$ |
|---|
| $S_1$ = make line from $sp_1, sp_2$ |
| $S_3$ = make line from $sp_0, sp_3$ |
| $v_1$ = get intersect of $S_1, S_3$ |
| $S_0$ = make line from $sp_0, sp_1$ |
| $S_2$ = make line from $sp_2, sp_3$ |
| $v_0$ = get intersect of $S_0, S_2$ |
| $E_2$ = make line from $sp_2, bp_2$ |
| $E_3$ = make line from $sp_3, bp_3$ |
| $v_2$ = get intersect of $E_2, E_3$ |
| $B_0$ = make line from $v_1, bp_3$ |
| $E_0$ = make line from $v_2, sp_0$ |
| $bp_0$ = get intersect of $B_0, E_0$ |
| $V_1$ = make line from $v_0, bp_0$ |
| $E_1$ = make line from $v_2, sp_1$ |
| $bp_1$ = get intersect of $V_1, E_1$ |

One skilled in the art could appreciate that different lines can be used to calculate the final BP corner point whose exemplary pseudo code is given in Table 1.C.

TABLE 1.C

| Algorithm 1.C of computing $bp_0, bp_1$ with input of $sp_0, sp_1, sp_2, sp_3, bp_2, bp_3$ |
|---|
| $S_1$ = make line from $sp_1, sp_2$ |
| $S_3$ = make line from $sp_0, sp_3$ |
| $v_1$ = get intersect of $S_1, S_3$ |
| $S_0$ = make line from $sp_0, sp_1$ |
| $S_2$ = make line from $sp_2, sp_3$ |
| $v_0$ = get intersect of $S_0, S_2$ |
| $E_2$ = make line from $sp_2, bp_2$ |
| $E_3$ = make line from $sp_3, bp_3$ |
| $v_2$ = get intersect of $E_2, E_3$ |
| $B_0$ = make line from $v_1, bp_3$ |
| $E_0$ = make line from $v_2, sp_0$ |
| $bp_0$ = get intersect of $B_0, E_0$ |
| $V_1$ = make line from $v_0, bp_0$ |
| $B_1$ = make line from $v_1, bp_2$ |
| $bp_1$ = get intersect of $V_1, B_1$ |

One skilled in the art could appreciate that above algorithms can have equivalent change. Exemplary pseudo code for computing rest two BP corner points which is an equivalent change of algorithm 1.A is given in Table 1.D.

TABLE 1.D

Algorithm 1.D of
computing $bp_0$, $bp_1$ with input of $sp_0$, $sp_1$, $sp_2$, $sp_3$, $bp_2$, $bp_3$ $S_1$ = make line from $sp_1$, $sp_2$
$S_3$ = make line from $sp_0$, $sp_3$
$v_1$ = get intersect of $S_1$, $S_3$
$E_2$ = make line from $sp_2$, $bp_2$
$E_3$ = make line from $sp_3$, $bp_3$
$v_2$ = get intersect of $E_2$, $E_3$
$B_0$ = make line from $v_1$, $bp_3$
$E_0$ = make line from $v_2$, $sp_0$
$bp_0$ = get intersect of $B_0$, $E_0$
$B_1$ = make line from $v_1$, $bp_2$
$E_1$ = make line from $v_2$, $sp_1$
$bp_1$ = get intersect of $B_1$, $E_1$ By using the above algorithms or equivalent ones, $bp_0$, $bp_1$ are calculated out from $sp_0$, $sp_1$, $sp_2$, $sp_3$, $bp_2$, $bp_3$.

In case of ($bp_1$, $bp_3$), Exemplary pseudo code for computing rest two BP corner points is given in Table 2.A.

TABLE 2.A

Algorithm 2.A of
computing $bp_0$, $bp_2$ with input of $sp_0$, $sp_1$, $sp_2$, $sp_3$, $bp_1$, $bp_3$ $S_1$ = make line from $sp_1$, $sp_2$
$S_3$ = make line from $sp_0$, $sp_3$
$v_1$ = get intersect of $S_1$, $S_3$
$E_1$ = make line from $sp_1$, $bp_1$
$E_3$ = make line from $sp_3$, $bp_3$
$v_2$ = get intersect of $E_1$, $E_3$
$B_0$ = make line from $v_1$, $bp_3$
$E_0$ = make line from $v_2$, $sp_0$
$bp_0$ = get intersect of $B_0$, $E_0$
$B_2$ = make line from $v_1$, $bp_1$
$E_2$ = make line from $v_2$, $sp_2$
$bp_2$ = get intersect of $B_2$, $E_2$ One skilled in the art could appreciate the algorithm 2.A can have equivalent ones by changing the sequence, calculating one more vanishing point or calculating with different outlines patterns.

In case of ($bp_1$, $bp_2$), Exemplary pseudo code for computing rest two BP corner points is given in Table 3.A.

TABLE 3.A

Algorithm 3.A of
computing $bp_0$, $bp_3$ with input of $sp_0$, $sp_1$, $sp_2$, $sp_3$, $bp_1$, $bp_2$ $S_0$ = make line from $sp_0$, $sp_1$
$S_2$ = make line from $sp_2$, $sp_3$
$v_0$ = get intersect of $S_0$, $S_2$
$E_1$ = make line from $sp_1$, $bp_1$
$E_2$ = make line from $sp_2$, $bp_2$
$v_2$ = get intersect of $E_1$, $E_2$
$B_0$ = make line from $v_0$, $bp_1$
$E_0$ = make line from $v_2$, $sp_0$
$bp_0$ = get intersect of $B_0$, $E_0$
$B_3$ = make line from $v_0$, $bp_2$
$E_3$ = make line from $v_2$, $sp_3$
$bp_3$ = get intersect of $B_3$, $E_3$ One skilled in the art could appreciate the algorithm 3.A can have equivalent ones by changing the sequence, calculating one more vanishing point or calculating with different outlines patterns.

In case of ($bp_0$, $bp_3$), Exemplary pseudo code for computing rest two BP corner points is given in Table 4.A.

TABLE 4.A

Algorithm 4.A of
computing $bp_1$, $bp_2$ with input of $sp_0$, $sp_1$, $sp_2$, $sp_3$, $bp_0$, $bp_3$ $S_0$ = make line from $sp_0$, $sp_1$
$S_2$ = make line from $sp_2$, spa
$v_0$ = get intersect of $S_0$, $S_2$
$E_0$ = make line from $sp_0$, $bp_0$
$E_3$ = make line from $sp_3$, $bp_3$
$v_2$ = get intersect of $E_0$, $E_3$
$B_1$ = make line from $v_0$, $bp_0$
$E_1$ = make line from $v_2$, $sp_1$
$bp_1$ = get intersect of $B_1$, $E_1$
$B_2$ = make line from $v_0$, $bp_1$
$E_2$ = make line from $v_2$, $sp_2$
$bp_2$ = get intersect of $B_2$, $E_2$ One skilled in the art could appreciate the algorithm 4.A can have equivalent ones by changing the sequence, calculating one more vanishing point or calculating with different outlines patterns.

In case of ($bp_0$, $bp_2$), Exemplary pseudo code for computing rest two BP corner points is given in Table 5.A.

TABLE 5.A

Algorithm 5.A of
computing $bp_1$, $bp_3$ with input of $sp_0$, $sp_1$, $sp_2$, $sp_3$, $bp_0$, $bp_2$ $S_0$ = make line from $sp_0$, $sp_1$
$S_2$ = make line from $sp_2$, $sp_3$
$v_0$ = get intersect of $S_0$, $S_2$
$E_0$ = make line from $sp_0$, $bp_0$
$E_2$ = make line from $sp_2$, $bp_2$
$v_2$ = get intersect of $E_0$, $E_2$
$B_1$ = make line from $v_0$, $bp_0$
$E_1$ = make line from $v_2$, $sp_1$
$bp_1$ = get intersect of $B_1$, $E_1$
$B_3$ = make line from $v_0$, $bp_2$
$E_3$ = make line from $v_2$, $sp_3$
$bp_1$ = get intersect of $B_3$, $E_3$ One skilled in the art could appreciate the algorithm 5.A can have equivalent ones by changing the sequence, calculating one more vanishing point or calculating with different outlines patterns.

In case of ($bp_0$, $bp_1$), Exemplary pseudo code for computing rest two BP corner points is given in Table 6.A.

TABLE 6.A

Algorithm 6.A of
computing $bp_2$, $bp_3$ with input of $sp_0$, $sp_1$, $sp_2$, $sp_3$, $bp_0$, $bp_1$ $S_1$ = make line from $sp_1$, $sp_2$
$S_3$ = make line from $sp_0$, $sp_3$
$v_1$ = get intersect of $S_1$, $S_3$
$E_0$ = make line from $sp_0$, $bp_0$
$E_1$ = make line from $sp_1$, $bp_1$
$v_2$ = get intersect of $E_0$, $E_1$
$B_2$ = make line from $v_1$, $bp_1$
$E_2$ = make line from $v_2$, $sp_2$
$bp_2$ = get intersect of $B_2$, $E_2$
$B_3$ = make line from $v_1$, $bp_0$
$E_3$ = make line from $v_2$, $sp_3$
$bp_3$ = get intersect of $B_3$, $E_3$ One skilled in the art could appreciate the algorithm 6.A can have equivalent ones by changing the sequence, calculating one more vanishing point or calculating with different outlines patterns.

One skilled in the art could appreciate that above algorithms can be modified equivalently; combined, rearranged, and any additional steps can be performed without departing from the scope of the invention.

So at 150, the rest 2 BP corner point positions are calculated when real number is used and there is no identify error.

But in practice, only non-real number (e.g., integer) value of point position can be input at 130, 140 and 170, or there is some error in identifying point position. In either or both cases, the input data will be different with the ideal one.

Figure 4A:
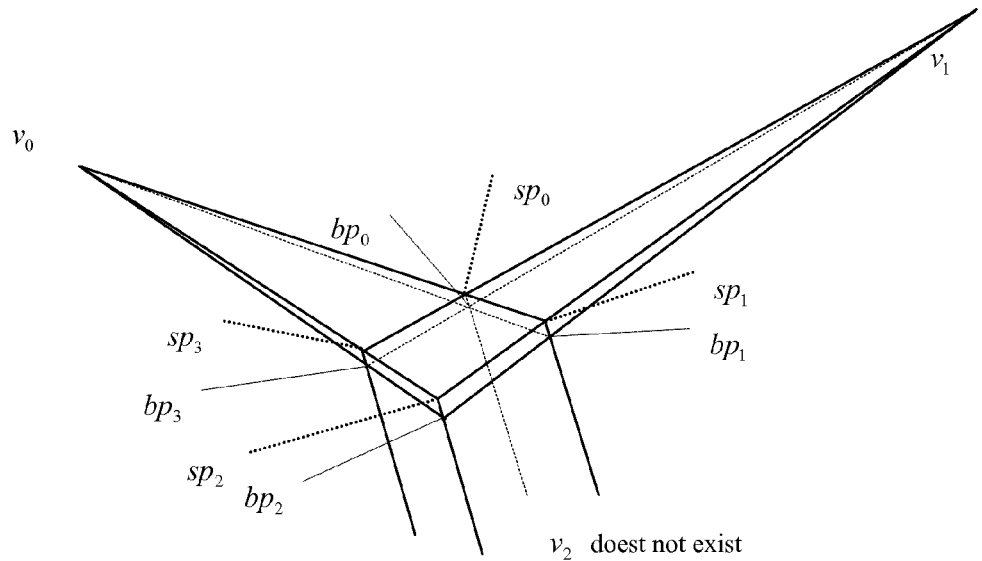
FIG. 4A-4B show illustrations of a thick reference object with some error in point positions.

When the vanishing point $v_2$ exits and $v_2$ and 2 BP corner points input at 140 are at the same side of SP, the rest 2 BP can be calculated with the same process describe above. When the vanishing point $v_2$ does not exit which is depicted in FIG. 4A, a following non-vanishing point patch algorithm is applied to the above algorithms.

Figure 4B:
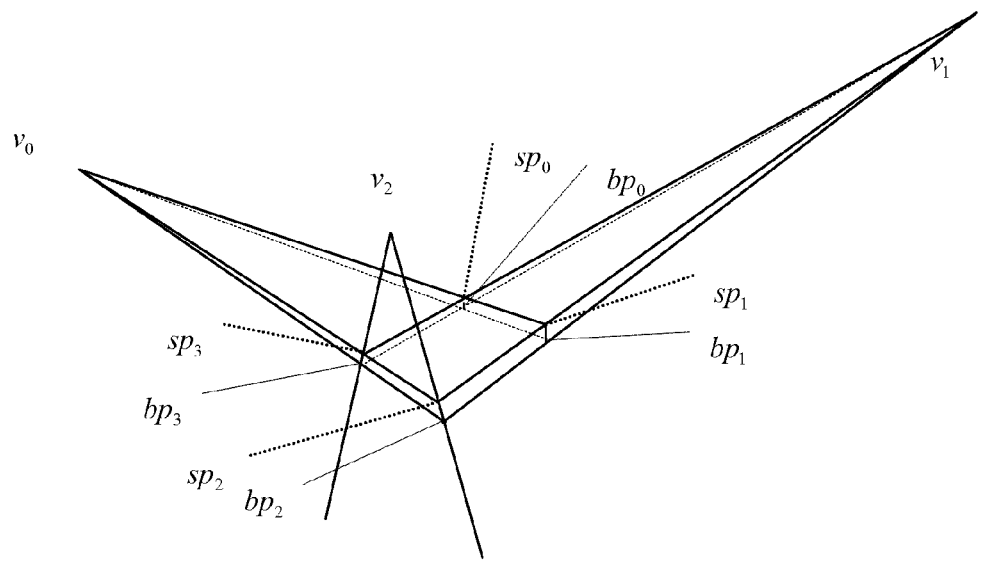

When the vanishing point $v_2$ exits and $v_2$ and 2 BP corner points input at 140 are not at the same side of SP which is depicted in FIG. 4B, the error in identifying point position is too great and BP corner point positions need to be input again at 140. One skilled in the art could appreciate that all 3 vanishing points (a.k.a., $v_0$, $v_1$, $v_2$) may not exist, and the same non-vanishing point patch algorithm can be applied to any of them.

Exemplary pseudo code for non-vanishing point patch algorithm is given in Table 7:

TABLE 7

Algorithm of non-vanishing point patch

```
v = get intersect of L₁, L₂
if ( v exists) then {
    B = make line from v, p
} else {
    B = make parallel line of L₁, L₂ which passes p
}
```

Exemplary pseudo code for algorithm 1.A combined with non-vanishing point patch is given in Table 8:

TABLE 8

Algorithm 1.A of
computing $bp_0$, $bp_1$ with input of $sp_0$, $sp_1$, $sp_2$, $sp_3$, $bp_2$, $bp_3$
combined with non-vanishing point patch

```
S₁ = make line from sp₁, sp₂
S₃ = make line from sp₀, sp₃
v₁ = get intersect of S₁, S₃
E₂ = make line from sp₂, bp₂
E₃ = make line from sp₃, bp₃
v₂ = get intersect of E₂, E₃
if ( v₁ exist) then {
    B₀ = make line from v₁, bp₃
    B₁ = make line from v₁, bp₂
} else {
    B₀ = make parallel line of S₁ which passes bp₃
    B₁ = make parallel line of S₁ which passes bp₂
}
if ( v₂ exists) then {
    E₀ = make line from v₂, sp₀
} else {
    E₀ = make parallel line of E₂ which passes sp₀
}
bp₀ = get intersect of B₀, E₀
if ( v₂ exists) then {
    E₁ = make line from v₂, sp₁
} else {
    E₁ = make parallel line of E₂ which passes sp₁
}
bp₁ = get intersect of B₁, Ei
```

One skilled in the art could appreciate that algorithms described in Table 1.A to Table 6.A and their equivalence can be combined with non-vanishing point patch algorithms.

Imaginative reference plane is an imagined projection plane in which the 4 points shape and its projection are equal in size.

Figure 5A:
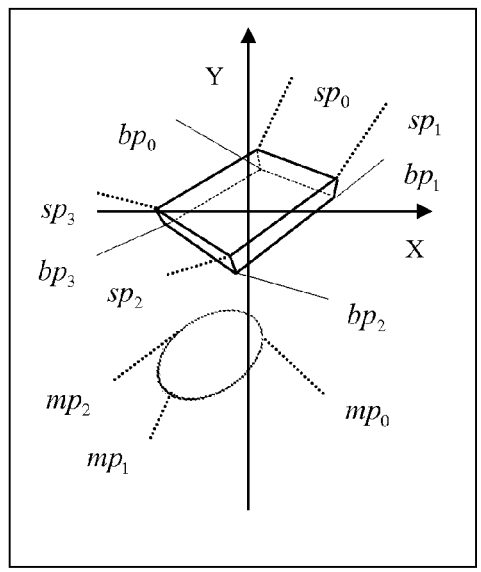
FIG. 5A-5B show illustrations of the image containing a thick reference object and a circle and the corresponding imaginative reference plane.
Figure 5B:
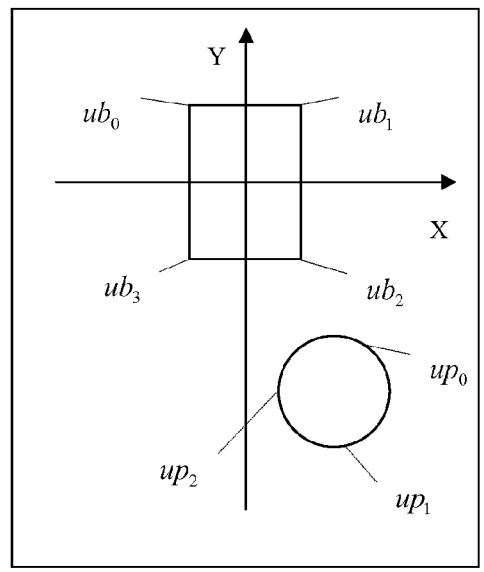

FIG. 5A is the image to measure with; in the image the unit is pixel. The points in the circle are at the same plane of BP in FIG. 5A. FIG. 5B is the imaginative reference plane of BP in FIG. 5A, in the imaginative reference plane the unit is the real metric unit.

The origin of the imaginative reference plane is the centriod of the reference object known size shape. The 4 corner points (a.k.a., $ub_0$, $ub_1$, $ub_2$, $ub_3$) of known size 4 points shape in the imaginative reference plane can be deduced from it real size easily.

The projection relationship between points in FIG. 5A and FIG. 5B is as following:

$ub_0$ is the projection point of $bp_0$ in the imaginative reference plane.

$ub_1$ is the projection point of $bp_1$ in the imaginative reference plane.

$ub_2$ is the projection point of $bp_2$ in the imaginative reference plane.

$ub_3$ is the projection point of $bp_1$ in the imaginative reference plane.

$up_0$ is the projection point of $mp_0$ in the imaginative reference plane.

$up_1$ is the projection point of $mp_1$ in the imaginative reference plane.

$up_2$ is the projection point of $mp_g$ in the imaginative reference plane.

$sp_0$, $sp_1$, $sp_2$ do not have projection points in the imaginative reference plane.

For example, if the known size 4 points shape is a rectangle whose width is 60 millimeter and height is 80 millimeter, the 4 corner points of the reference object in the imaginative reference plane are $ub_0=(-30,40)$, $ub_1=(30,40)$, $ub_2=(30,-40)$, $ub_3=(-30,-40)$ and unit is millimeter. One skilled in the art could appreciate that the known size can be represented with a different unit of measurement or different Cartesian coordinates if necessary.

Changing the unit of measurement is useful for a better user experience. For example, If United States customary system is used instead of metric system, the above four corner points of the reference object in the imaginative reference plane are $ub_0=(-30/25.4, 40/25.4)$, $ub_1=(30/25.4, 40/25.4)$, $ub_2=(30/25.4, -40/25.4)$, $ub_3=(-30/25.4, -40/25.4)$ and unit is inch.

At 160, the homography matrix H between back plane and imaginative reference plane is calculated with the same normalized DLT in prior art. The corresponding point for $mp_h$ in imaginative reference plane is called un-project point, $up_n$ for short. With this homography matrix H, any MP point in the image can be translated into the imaginative reference plane with the following equation:

$$up_n = H * mp_n$$

At 170, for any $mp_n$, its corresponding $up_n$ can be calculated with homography matrix H. With the known geometry equation in Cartesian coordinates and enough valid points in MP, the geometry parameters in the geometry equation are determined.

The point position is the simplest geometry parameter which is the value of un-project point position in imaginative reference plane. With the known geometry equation of known geometry parameters, the geometry object is determined, thus useful and practical information can be calculated from the geometry equations. For example, if two point positions in the imaginative reference plane are known, the distance of the two points can be calculated.

For a bit more complicated geometry object like circle. 3 independent points in MP determine the circle. Following the prior art, the center and radius of the circle can be calculated with the 3 un-project points.

For any geometry object whose geometry equation is $f(p)=0$, just get enough un-project points to determine the geometry parameters of the function $f(p)=0$ which fulfill the following linear equations:

$$\begin{cases} f(up_0) = 0 \\ \ldots \\ f(up_m) = 0 \end{cases}$$

If more than enough points in MP are provide, only enough number of points are chosen from them and calculated, or over constrained linear equations is resolved with a certain criterion of a cost function. For example, a linear least squares minimization cost function is used, when an approximate solution for geometry parameter is resolved for over constrained linear equations.

With the calculated geometry parameters of geometry objects which exist in the same MP, useful information can be calculated from. For example, geometry parameters of two points are calculated, that is to say, the two point positions in imaginative reference plane is calculated, so the real distance between the two points can be calculated.

The above described embodiments of the present invention are presented for purposes of illustration and not of limitation, and the present invention is limited only by the claims which follow.

We claim:

1. A method of measuring geometry parameters of a geometry object with a reference object whose thickness can not be ignored in an image, comprising:
   providing a reference object which has two parallel imaginative surface planes substantially;
   providing 4 imaginative point pairs in which one point of said imaginative point pair exists in one of said two parallel imaginative surface planes and other point of same said imaginative point pair exists in other of said two parallel imaginative surface planes, and any line going through two points of any single said imaginative point pair is parallel with other line going through two points of other single said imaginative point pair substantially;
   providing 4 points out of said 4 imaginative point pairs in one of said two parallel imaginative surface planes form a known size 4 points shape which is represented with a unit of measurement;
   obtaining an image of said reference object and a geometry object contacting with one of said two parallel imaginative surface planes substantially from a source in which at least 6 points within said 4 imaginative point pairs are distinguishable by a machine;
   providing a geometry equation of said geometry object is known and geometry parameters of said geometry equation are unknown;
   identifying said 6 points on said image;
   computing rest 2 points of said 4 imaginative point pairs by a processor;
   using 4 points of said 4 imaginative point pairs in one of said two parallel imaginative surface planes with which said geometry object contacts in said image and said known size 4 points shape to calculate a homography matrix by a processor;
   identifying enough valid points for said geometry equation of said geometry object in said image;
   calculating said geometry parameters which is represented with said unit of measurement of said geometry equation of said geometry object from said enough valid points for said geometry equation of said geometry object in said image, said geometry equation of said geometry object and said homography matrix by a processor.

2. A method of claim 1, further including calibration for said image from said source by a processor.

3. A method of claim 1, wherein said identifying said 6 points on said image comprises identifying said 6 points on said image by using automatic methods by a processor.

4. A method of claim 1, wherein said identifying said 6 points on said image comprises identifying lines in said image and getting part of said 6 points as an intersecting point of said lines by a processor.

5. A method of claim 1, further including identifying more than enough valid points for said geometry equation of said geometry object in said image and choosing said enough valid points from said more than enough valid points for said geometry equation of said geometry object in said image by a processor.

6. A method of claim 1, further including identifying more than enough valid points for said geometry equation of said geometry object in said image and calculating said geometry parameters of said geometry equation of said geometry object from said more than enough valid points for said geometry equation of said geometry object in said image which makes a cost function fulfills a criterion by a processor.

7. A method of claim 1, further including calculating useful information from said geometry equation of said geometry object by a processor.

8. A method of claim 1, further including changing said unit of measurement to a different unit of measurement by a processor.

9. A method of claim 1, wherein said identifying said 6 points on said image comprises identifying said 6 points on said image by using automatic methods and further including calibration for said image from said source by a processor.

10. A method of claim 9, further including changing said unit of measurement to a different unit of measurement by a processor.

11. A method of claim 1, wherein said identifying said 6 points on said image comprises identifying lines in said image and getting part of said 6 points as an intersecting point of said lines and further including calibration for said image from said source by a processor.

12. A method of claim 10, further including changing said unit of measurement to a different unit of measurement by a processor.

13. A method of claim 1, wherein said identifying said 6 points on said image comprises identifying said 6 points on said image by using automatic methods and further including identifying more than enough valid points for said geometry equation of said geometry object in said image and choosing said enough valid points from said more than enough valid points for said geometry equation of said geometry object in said image by a processor.

14. A method of claim 1, wherein said identifying said 6 points on said image comprises identifying lines in said image and getting part of said 6 points as an intersecting point of said lines and further including identifying more than enough valid points for said geometry equation of said geometry object in said image and choosing said enough valid points from said more than enough valid points for said geometry equation of said geometry object in said image by a processor.

15. A method of claim 1, wherein said identifying said 6 points on said image comprises identifying said 6 points on said image by using automatic methods and further including identifying more than enough valid points for said geometry equation of said geometry object in said image and calculating said geometry parameters of said geometry equation of said geometry object from said more than enough valid points for said geometry equation of said geometry object in said image which makes a cost function fulfills a criterion by a processor.

16. A method of claim 1, wherein said identifying said 6 points on said image comprises identifying lines in said image and getting part of said 6 points as an intersecting point of said lines and further including identifying more than enough valid points for said geometry equation of said geometry object in said image and calculating said geometry parameters of said geometry equation of said geometry object from said more than enough valid points for said geometry equation of said geometry object in said image which makes a cost function fulfills a criterion by a processor.

17. A method of claim 1, wherein said identifying said 6 points on said image comprises identifying said 6 points on said image by using automatic methods and further including calculating useful information from said geometry equation of said geometry object by a processor.

18. A method of claim 1, wherein said identifying said 6 points on said image comprises identifying lines in said image and getting part of said 6 points as an intersecting point of said lines and further including calculating useful information from said geometry equation of said geometry object by a processor.

19. A method of claim 1, wherein said identifying said 6 points on said image comprises identifying said 6 points on said image by using automatic methods and further including changing said unit of measurement to a different unit of measurement by a processor.

20. A method of claim 1, wherein said identifying said 6 points on said image comprises identifying lines in said image and getting part of said 6 points as an intersecting point of said lines and further including changing said unit of measurement to a different unit of measurement by a processor.

* * * * *